UNITED STATES PATENT OFFICE.

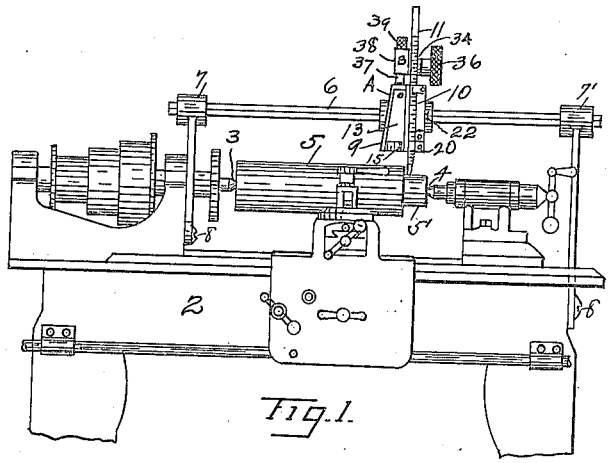

LINO SCUSA, OF PHOENIX, NEW YORK.

INDICATOR-GAGE.

1,317,227.

Specification of Letters Patent. Patented Sept. 30, 1919.

Application filed January 2, 1919. Serial No. 269,263.

*To all whom it may concern:*

Be it known that I, LINO SCUSA, a citizen of the United States, residing at Phoenix, in the county of Onondaga and State of New York, have invented certain new and useful Improvements in Indicator-Gages, of which the following is a specification.

This invention relates to improvements in indicator gages, and has for its object to provide a novel, simple and accurate gage of the class, adapted to be used in connection with lathes or other machines for indicating the finish measurements, such as the diameter of a piece of work which is being turned, also for gaging lengths and depths of other work. A further object is to provide an indicating gage adapted to take the place of the common calipers, and which is capable of gaging and indicating the diameters and thicknesses of work while the same is in motion, without requiring the stopping of the machines. A further object is to provide a gage having an adjustable scale for indicating the coarser measurements, and also a needle for indicating the finer or limit measurements. And a further object is to provide an adjustable stop which is associated with a movable scale, the former being provided with a micrometer-like attachment for justifying the main scale after the same is set.

I attain these objects by the means set forth in the detailed description which follows, and as illustrated by the accompanying drawing, in which—

Figure 1 is a side elevation of a lathe, having my improvement applied thereto; showing a piece of work in the act of being turned and gaged.

Fig. 2 is an end elevation of the lathe.

Fig. 3 is an enlarged face view of the indicator gage.

Fig. 4 is a similar view, partially in plan and partially in section; the section being taken on line 4—4 of Fig. 5.

Fig. 5 is a top-end view of the gage.

Fig. 6 is an edge view of the same, and

Fig. 7 is a top-end view of the stop.

In the drawing, 2 is a conventional representation of a lathe, and 3 and 4 are the head and tail centers, between which is pivoted a cylindrical piece of work 5, having a portion 5' turned down to a smaller diameter. My indicator gage A is adjustably mounted on the lathe, preferably at the rear side, by means of a square rod 6, which is preferably rigidly supported by rearwardly extending brackets 7 and 7', the same being secured respectively to the head and tail of the lathe by screws 8.

The gage comprises an oblong body 9, having a longitudinal groove 10 near one edge, in which is slidable a bar 11, the face of the latter being provided with graduations preferably representing inches and fractions thereof, which start some distance from the top end of the bar and extend to within a short distance of the lower end, the said end being reduced in thickness for insertion into narrow cuts. The body 9 at one side of the groove 10 is hollow, as at 12, and this portion is closed by a cover 13 held in place by a screw 14, which is threaded into a boss 14'. At the lower end of the cavity 12 is a scale which runs in opposite directions from zero, the graduations of said scale preferably representing thousandths of an inch. Within the cavity 12 is pivoted a needle 15, at 15', whch is operated by a bell-crank lever 16, pivoted at 16' near the top end of the cavity, while the longer arm of said lever is pivoted to the needle at 17. Above the pivot 16' the lever has a dull point 18, which normally projects a short distance above the top of the body 9, as shown in Figs. 3 and 6. When pressure is applied to the point 18, the needle is deflected from right to left, as shown by the dotted lines in Fig. 4. When at rest, the needle 15 is normally held at the right side of the cavity 12 by a spring 19.

The scale-bar 11 is held slidably in the groove 10 by guards 20, which are rigid with the body. 21 is a detachable part having a single graduation numbered 0, said part being held in place by a screw 21'. To adjust and set the bar 11 for any certain measurement, the particular graduation on the bar is brought into register with the zero mark on the insert 21. The bar 11 may be rigidly held in any adjusted position by means of a set-screw 22. Near the lower end of the bar 11 is a short stud 23, which engages a snap-spring 24 (see Fig. 6) for holding said bar in its uppermost position, when at rest, out of the way of the work. The said stud and spring also prevent the accidental detachment of the bar from the body. When used in connection with lathe work, as illustrated, the body 9 is pivoted to a support 25, by two lugs 26 which are integral with the body and are disposed in suitable sockets 27 in the body of the support, and said parts are held in place by a pin 28. The support 25 has a cylindrical part 29 at its rear side, which is provided with a square opening to receive the rod 6, and said rod is held firmly against the lower sides of said opening by a block 30, which is depressed by a spring 31. The body 9 and the support 25 are normally held parallel to each other by a stop 32 and a coil spring 33, the latter allowing the lower end of the body 9 a certain amount of movement toward and away from the support. This resilient connection causes the lower end of the bar 11 to retain its engagement with the work, as 5', whether or not the latter rotates truly, as well as when the surface of the work is rough or uneven, without straining the gage parts.

In practice, the scale-bar is movable freely in the groove 10, except when the stud 23 engages the spring 24, and in order to limit the longitudinal movement of said bar toward the work during the gaging operations for indicating the exact measurements, I provide an adjustable stop B, comprising a U-shaped clamp 34, which rigidly supports a screw 35, the latter being cutaway where it bears upon the face of the scale-bar 11. The jaws of the clamp are tightened against the opposite sides of the bar 11 by means of a thumb-nut 36. The stop proper consists of a plunger 37, which is movable in a cylindrical part 38 preferably integral with the clamp. The upper end of the plunger is threaded, and said plunger is adjustable longitudinally in the part 38 by means of a nut 39. The plunger 37 is also resiliently held in its lowermost position by means of a spring 40. The nut 39 operates against the tension of the spring 40 during the adjustment of the plunger. The main object of the spring 40 is to allow a slight yielding upwardly of the plunger in case the bar 11 gravitates abruptly, and thus prevents injury to or battering of the free end of the plunger due to rough handling of the gage.

The operation of my gage when used for gaging duplicate turning work, is as follows: Assuming that the work 5 is a master part, which had previously been prepared, and from which exact duplicate parts are to be made, after the operator installs the master piece, he slides the gage along the rod 6 until it is opposite the work. He then releases the bar 11 from the spring 24 and slides, or allows the same, to gravitate in the groove 10 until its lower end is brought into engagement with the turned portion 5' of the work (see Figs. 1, 2 and 3). He then reads the scale on the bar 11 and ascertains the exact measurement (diameter) indicated by the graduation of the bar 11 which registers with the zero mark on the insert 21, which, for example, as shown in Fig. 3, is found to be twelve inches. The next step is to set the stop B, by sliding the same along the bar 11 until the plunger 37 rests fairly upon the point 18 of lever 16 (see Figs. 3 and 6), but not heavily enough to cause the deflection of the needle 15. He then tightens up the thumb-nut 36 for rigidly clamping the stop to the bar, after which the master-piece of the work is removed and a new unwrought piece is applied to the lathe. In case the tightening up of the thumb-nut 36 disturbs the registration of the graduation 12 relatively to the zero mark on the part 21, the operator manipulates the nut 39 in the proper direction for raising or lowering the plunger 37 sufficiently to rectify the said discrepancy of the indicated measurement.

The operator next proceeds to turn down the new piece, and as this work progresses, instead of stopping the lathe at frequent intervals to caliper the cut, as formerly, he simply brings the lower end of the bar 11 into engagement with the cut portion 5' and leaves it there until the turning work is done. The gage is preferably mounted on the lathe at an angle of 45°, so that the bar 11 readily gravitates toward the center of the work as the turning progresses without assistance. By positioning the gage at the rear side of the lathe, the cutting tool and the bar 11 never interfere. Furthermore, the face of the gage is also directly in front of the operator, and he can readily see and read the scale, and in this way he may continue his turning operations until the particular graduation of the bar registers with the zero mark on the insert 21. If the operator is engaged in getting out parts commonly called "limit" work, wherein a leeway of two or three thousandths of an inch either way from the exact measurement is allowed, he has recourse to the needle 15 and the finer scale over which the needle plays, for ascertaining whether or not the limit is reached or exceeded. For example, in case the last turning operation brings the twelve inch graduation of the bar 11 (see Fig. 3) exactly in line with the zero mark, the bar 11 resting firmly on the finished work will move the plunger 37 into engagement with the point 18 of lever 16 without exerting any pressure on said lever, and therefore the needle 15 will not be disturbed. If however, the last turning operation reduces the diameter of the work 5' slightly under the twelve inches, the combined weight of the bar 11 and the stop B bearing upon the lever 16 will instantly deflect the needle 15 toward the right for indicating the number of thousandths of an inch the work is deficient. In case the deficiency is still within the limit allowed, the work will pass inspection, otherwise it will be discarded.

Standard, as well as special scales may be employed in connection with the other parts of my gage, for gaging and measuring various kinds of work. For gaging turning work, as herein shown, the scale on the bar 11, although numbered and subdivided for inches and the usual fractional parts thereof, the actual distance between the major graduations, as a—a (Fig. 3), is intended to be but one-half inch corresponding to the radius of the work 5'. The scale, however, is read and understood in terms denoting the full measurement or diameter of the work.

The foregoing describes in detail the construction, arrangement and operation of the gage. Obviously the device may be employed for measuring and gaging many different kinds of work, and some changes or modifications may be made in the parts of the same, within the scope defined by the appended claims, without departing from the spirit of the invention.

What I claim as new and desire to secure by Letters Patent, is—

1. An indicator gage comprising an oblong body having an open groove adjacent one edge, a graduated bar slidable by gravity in said groove, and an adjustable stop on said bar adapted to be clamped to the bar in different positions for limiting the gravitative movements of said bar.

2. An indicator gage comprising a body having an open groove adjacent one lateral edge, a graduated bar slidable by gravity in said groove, a snap-spring for holding said bar in the idle position, and an adjustable stop on said bar adapted to be set in different positions for limiting the gravitative movements of said bar in the direction for gaging work.

3. An indicator gage including a hollow body having a groove adjacent the hollow portion, a graduated bar slidable by gravity in said groove, an adjustable stop on said bar adapted to be clamped to the bar for limiting the gravitative movements of the bar for indicating predetermined measurements, and means operated by said stop for justifying said bar for correcting inaccuracies in the setting of said stop.

4. In an indicator gage, the combination with a body having a longitudinal groove and an insert bearing a zero mark, of a bar slidable downward in said groove and having graduations adapted to register with said zero mark, and a stop adjustable on said bar and adapted to be rigidly clamped thereto for limiting the downward movements of said bar to predetermined distances, said stop including a plunger adapted to be reciprocated for correcting inaccuracies occurring in the setting of said bar.

5. An indicator gage comprising a hollow body having a groove, a gravitative bar slidable in said groove, said bar adapted to be held by gravity in engagement with the work and tending to gravitate toward the axis of the work, means for automatically stopping the gravitative movements of said bar, and a needle adapted to be actuated by the weight of said bar for indicating when predetermined measurements have been reached in the execution of the work.

6. A gage for indicating finish measurements of turning work, comprising a body having a groove and a zero mark adjacent said groove, a support for holding said body stationary during the gaging operations, said support adjustable for positioning the gage relatively to the work, a graduated bar slidable in said groove and adapted to gravitate toward the center of the work as the turning progresses for bringing predetermined graduations into register with said zero mark.

7. In an indicator gage, the combination with the body having a groove adjacent one edge and a zero mark at right angles to said groove, of a bar slidable downward in said groove and having graduations adapted to register with said zero mark, a stop adjustable on said bar adapted to be clamped thereto for stopping the gravitative movements of said bar when predetermined measurements are indicated at the zero mark, said stop including a plunger adjustable for correcting inaccuracies occurring in the setting of the stop, and a needle supported in said body and actuated by said plunger for indicating "limit" measurements.

8. An indicator gage comprising a hollow body having a groove and a zero mark adjacent said groove, a gravitative bar slidable in said groove and having graduations adapted to register with said zero mark for indicating various measurements, said bar adapted to be held by gravity in engagement with the work and tending to gravitate toward the center of the work, adjustable means for automatically stopping the downward movements of said bar when predetermined measurements are effected, and a needle adapted to be actuated by the weight of said bar for indicating when limits beyond the predetermined measurements have been reached in the execution of the work.

9. A gage for indicating finish measurements of turning work, comprising a body having a groove and a zero mark, a bar slidable by gravity in said groove and having a scale comprising graduations adapted to register with said zero mark for indicating the progress of the mechanic's work, an adjustable stop having a resilient adjustable plunger adapted to stop the gravitative movements of said bar when the work has been reduced to a predetermined dimension, and independent means actuated by said plunger for indicating a limit above or below said dimension.

10. In an indicating gage, the combination with a body having a groove and a zero mark adjacent said groove and a graduated bar slidable by gravity in said groove, of an adjustable stop slidable by gravity on said bar adapted to be clamped to said bar in different positions for limiting the gravitative movements of said bar, said stop having a resilient plunger adapted to be manipulated for correcting slight discrepancies in the setting of said stop and said bar, a needle pivoted in said body adapted to be actuated by said plunger and the weight of said stop and bar for indicating certain limits above and below predetermined measurements.

In testimony whereof I affix my signature.

LINO SCUSA.